United States Patent
Wang

(10) Patent No.: US 8,947,812 B1
(45) Date of Patent: Feb. 3, 2015

(54) DATA STORAGE DEVICE COMPRISING EQUALIZER FILTER AND INTER-TRACK INTERFERENCE FILTER

(71) Applicant: Western Digital Technologies, Inc., Irvine, CA (US)

(72) Inventor: Alvin J. Wang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/227,896

(22) Filed: Mar. 27, 2014

(51) Int. Cl.
G11B 5/09 (2006.01)
G11B 20/10 (2006.01)

(52) U.S. Cl.
CPC ............ *G11B 20/10212* (2013.01); *G11B 5/09* (2013.01); *G11B 20/10287* (2013.01)
USPC .............. 360/53; 360/65; 360/39; 369/53.35; 369/59.1

(58) Field of Classification Search
None
See application file for complete search history.

(56) References Cited

U.S. PATENT DOCUMENTS

| 5,229,901 | A | 7/1993 | Mallary |
|---|---|---|---|
| 5,321,559 | A | 6/1994 | Nguyen et al. |
| 5,588,011 | A | 12/1996 | Riggle |
| 5,606,464 | A | 2/1997 | Agazzi et al. |
| 5,822,143 | A | 10/1998 | Cloke et al. |
| 5,825,832 | A | 10/1998 | Benedetto |
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,104,766 | A | 8/2000 | Coker et al. |
| 6,105,104 | A | 8/2000 | Guttmann et al. |
| 6,111,717 | A | 8/2000 | Cloke et al. |
| 6,145,052 | A | 11/2000 | Howe et al. |
| 6,154,335 | A | 11/2000 | Smith et al. |
| 6,157,510 | A | 12/2000 | Schreck et al. |
| 6,175,893 | B1 | 1/2001 | D'Souza et al. |
| 6,178,056 | B1 | 1/2001 | Cloke et al. |
| 6,191,909 | B1 | 2/2001 | Cloke et al. |
| 6,195,218 | B1 | 2/2001 | Guttmann et al. |
| 6,205,494 | B1 | 3/2001 | Williams |

(Continued)

OTHER PUBLICATIONS

Patrick J. Lee, et. al., U.S. Appl. No. 13/789,071, filed Mar. 7, 2013, 15 pages.

*Primary Examiner* — Muhammad N Edun

(57) ABSTRACT

A data storage device is disclosed comprising a head actuated over a disk. A read signal from the head is sampled to generate signal samples, and the signal samples are filtered with an equalizer filter to generate equalized samples. The equalized samples are filtered with an inter-track interference (ITI) filter to generate ITI attenuated samples, and a data sequence is detected based on the ITI attenuated samples. In one embodiment, the ITI filter comprises a transfer function:

$$1-\text{HPF}(e_k)$$

and in another embodiment the ITI filter comprises a transfer function:

$$1-\text{LPF}(e_k)$$

where $e_k$ represents a noise sequence in the equalized samples, HPF represents a high pass filter operating on $e_k$, and LPF represents a low pass filter operating on $e_k$.

24 Claims, 6 Drawing Sheets

(56) References Cited

U.S. PATENT DOCUMENTS

| | | |
|---|---|---|
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,047 B1 | 10/2002 | Kleinerman et al. |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,532,272 B1 | 3/2003 | Ryan et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,094 B2 | 7/2003 | Rae et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,625,235 B1 | 9/2003 | Coker et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,741,645 B2 | 5/2004 | Tan et al. |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,140 B2 | 11/2004 | Brommer et al. |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,326 B1 | 3/2005 | Eran et al. |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |

(56) References Cited

U.S. PATENT DOCUMENTS

| | | |
|---|---|---|
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,549 B2 | 9/2006 | Asakura |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,158,324 B2 * | 1/2007 | Stein et al. .................. 360/31 |
| 7,165,211 B2 * | 1/2007 | Stein et al. .................. 714/795 |
| 7,171,108 B1 | 1/2007 | Masters et al. |
| 7,171,110 B1 | 1/2007 | Wilshire |
| 7,173,783 B1 | 2/2007 | McEwen et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,212,593 B2 | 5/2007 | He |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,259,927 B2 | 8/2007 | Harris |
| 7,263,652 B2 | 8/2007 | Zaboronski et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,286,595 B2 | 10/2007 | Cideciyan et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,360,147 B2 | 4/2008 | Vasiliev |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,424,074 B2 | 9/2008 | Lee et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,471,746 B2 | 12/2008 | Radich |
| 7,486,060 B1 | 2/2009 | Bennett |
| 7,496,493 B1 | 2/2009 | Stevens |
| 7,518,819 B1 | 4/2009 | Yu et al. |
| 7,522,367 B2 | 4/2009 | Eleftheriou et al. |
| 7,525,746 B1 | 4/2009 | Oberg |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,561,640 B2 | 7/2009 | Kaynak et al. |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,729,071 B2 * | 6/2010 | Harada .................. 360/39 |
| 7,730,295 B1 | 6/2010 | Lee |
| 7,738,201 B2 | 6/2010 | Jin et al. |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,948,703 B1 | 5/2011 | Yang |
| 7,974,029 B1 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |

(56) References Cited

U.S. PATENT DOCUMENTS

| | | | |
|---|---|---|---|
| 8,014,094 B1 | 9/2011 | Jin | |
| 8,014,977 B1 | 9/2011 | Masiewicz et al. | |
| 8,019,914 B1 | 9/2011 | Vasquez et al. | |
| 8,040,625 B1 | 10/2011 | Boyle et al. | |
| 8,078,943 B1 | 12/2011 | Lee | |
| 8,079,045 B2 | 12/2011 | Krapf et al. | |
| 8,082,433 B1 | 12/2011 | Fallone et al. | |
| 8,085,487 B1 | 12/2011 | Jung et al. | |
| 8,089,719 B1 | 1/2012 | Dakroub | |
| 8,090,902 B1 | 1/2012 | Bennett et al. | |
| 8,090,906 B1 | 1/2012 | Blaha et al. | |
| 8,091,112 B1 | 1/2012 | Elliott et al. | |
| 8,094,396 B1 | 1/2012 | Zhang et al. | |
| 8,094,401 B1 | 1/2012 | Peng et al. | |
| 8,116,020 B1 | 2/2012 | Lee | |
| 8,116,025 B1 | 2/2012 | Chan et al. | |
| 8,134,793 B1 | 3/2012 | Vasquez et al. | |
| 8,134,798 B1 | 3/2012 | Thelin et al. | |
| 8,139,301 B1 | 3/2012 | Li et al. | |
| 8,139,310 B1 | 3/2012 | Hogg | |
| 8,144,419 B1 | 3/2012 | Liu | |
| 8,145,452 B1 | 3/2012 | Masiewicz et al. | |
| 8,149,528 B1 | 4/2012 | Suratman et al. | |
| 8,154,812 B1 | 4/2012 | Boyle et al. | |
| 8,159,768 B1 | 4/2012 | Miyamura | |
| 8,161,328 B1 | 4/2012 | Wilshire | |
| 8,164,849 B1 | 4/2012 | Szeremeta et al. | |
| 8,174,780 B1 | 5/2012 | Tsai et al. | |
| 8,190,575 B1 | 5/2012 | Ong et al. | |
| 8,194,338 B1 | 6/2012 | Zhang | |
| 8,194,340 B1 | 6/2012 | Boyle et al. | |
| 8,194,341 B1 | 6/2012 | Boyle | |
| 8,201,066 B1 | 6/2012 | Wang | |
| 8,259,872 B2 | 9/2012 | Wu et al. | |
| 8,271,692 B1 | 9/2012 | Dinh et al. | |
| 8,271,863 B2 | 9/2012 | Yang et al. | |
| 8,279,550 B1 | 10/2012 | Hogg | |
| 8,281,218 B1 | 10/2012 | Ybarra et al. | |
| 8,285,923 B2 | 10/2012 | Stevens | |
| 8,289,656 B1 | 10/2012 | Huber | |
| 8,300,339 B1 | 10/2012 | Nangare et al. | |
| 8,305,705 B1 | 11/2012 | Roohr | |
| 8,307,156 B1 | 11/2012 | Codilian et al. | |
| 8,310,775 B1 | 11/2012 | Boguslawski et al. | |
| 8,315,006 B1 | 11/2012 | Chahwan et al. | |
| 8,316,263 B1 | 11/2012 | Gough et al. | |
| 8,320,067 B1 | 11/2012 | Tsai et al. | |
| 8,324,974 B1 | 12/2012 | Bennett | |
| 8,332,695 B2 | 12/2012 | Dalphy et al. | |
| 8,339,919 B1 | 12/2012 | Lee | |
| 8,341,337 B1 | 12/2012 | Ong et al. | |
| 8,350,628 B1 | 1/2013 | Bennett | |
| 8,356,184 B1 | 1/2013 | Meyer et al. | |
| 8,370,683 B1 | 2/2013 | Ryan et al. | |
| 8,375,225 B1 | 2/2013 | Ybarra | |
| 8,375,274 B1 | 2/2013 | Bonke | |
| 8,380,922 B1 | 2/2013 | DeForest et al. | |
| 8,390,948 B2 | 3/2013 | Hogg | |
| 8,390,952 B1 | 3/2013 | Szeremeta | |
| 8,392,689 B1 | 3/2013 | Lott | |
| 8,407,393 B1 | 3/2013 | Yolar et al. | |
| 8,413,010 B1 | 4/2013 | Vasquez et al. | |
| 8,417,566 B2 | 4/2013 | Price et al. | |
| 8,421,663 B1 | 4/2013 | Bennett | |
| 8,422,172 B1 | 4/2013 | Dakroub et al. | |
| 8,427,770 B1 | 4/2013 | O'Dell et al. | |
| 8,427,771 B1 | 4/2013 | Tsai | |
| 8,429,343 B1 | 4/2013 | Tsai | |
| 8,433,937 B1 | 4/2013 | Wheelock et al. | |
| 8,433,977 B1 | 4/2013 | Vasquez et al. | |
| 8,441,750 B1 | 5/2013 | Nangare et al. | |
| 8,441,909 B1 | 5/2013 | Thayamballi et al. | |
| 8,456,980 B1 | 6/2013 | Thayamballi | |
| 8,458,526 B2 | 6/2013 | Dalphy et al. | |
| 8,462,466 B2 | 6/2013 | Huber | |
| 8,467,151 B1 | 6/2013 | Huber | |
| 8,483,027 B1 | 7/2013 | Mak et al. | |
| 8,489,841 B1 | 7/2013 | Strecke et al. | |
| 8,493,679 B1 | 7/2013 | Boguslawski et al. | |
| 8,499,198 B1 | 7/2013 | Messenger et al. | |
| 8,514,506 B1 | 8/2013 | Li et al. | |
| 8,537,482 B1 | 9/2013 | Song et al. | |
| 8,554,741 B1 | 10/2013 | Malina | |
| 8,560,759 B1 | 10/2013 | Boyle et al. | |
| 8,576,509 B1 | 11/2013 | Hogg | |
| 8,576,511 B1 | 11/2013 | Coker et al. | |
| 8,578,100 B1 | 11/2013 | Huynh et al. | |
| 8,578,242 B1 | 11/2013 | Burton et al. | |
| 8,582,223 B1 | 11/2013 | Garani et al. | |
| 8,582,231 B1 | 11/2013 | Kermiche et al. | |
| 8,589,773 B1 | 11/2013 | Wang et al. | |
| 8,593,753 B1 | 11/2013 | Anderson | |
| 8,599,508 B1 | 12/2013 | Burd | |
| 8,599,512 B2 | 12/2013 | Hogg | |
| 8,605,379 B1 | 12/2013 | Sun | |
| 8,611,031 B1 | 12/2013 | Tan et al. | |
| 8,611,032 B2 | 12/2013 | Champion et al. | |
| 8,612,798 B1 | 12/2013 | Tsai | |
| 8,619,383 B1 | 12/2013 | Jung et al. | |
| 8,619,508 B1 | 12/2013 | Krichevsky et al. | |
| 8,619,529 B1 | 12/2013 | Liew et al. | |
| 8,621,115 B1 | 12/2013 | Bombet et al. | |
| 8,621,133 B1 | 12/2013 | Boyle | |
| 8,625,224 B1 | 1/2014 | Lin et al. | |
| 8,625,225 B1 | 1/2014 | Wang | |
| 8,626,463 B2 | 1/2014 | Stevens et al. | |
| 8,630,052 B1 | 1/2014 | Jung et al. | |
| 8,631,188 B1 | 1/2014 | Heath et al. | |
| 8,635,412 B1 | 1/2014 | Wilshire | |
| 8,661,193 B1 | 2/2014 | Cobos et al. | |
| 8,665,547 B1 | 3/2014 | Yeo et al. | |
| 8,667,248 B1 | 3/2014 | Neppalli | |
| 8,670,205 B1 | 3/2014 | Malina et al. | |
| 8,671,250 B2 | 3/2014 | Lee | |
| 8,681,442 B2 | 3/2014 | Hogg | |
| 8,681,445 B1 | 3/2014 | Kermiche et al. | |
| 8,683,295 B1 | 3/2014 | Syu et al. | |
| 8,687,306 B1 | 4/2014 | Coker et al. | |
| 8,687,307 B1 | 4/2014 | Patton, III | |
| 8,687,313 B2 | 4/2014 | Selvaraj | |
| 8,693,133 B1 | 4/2014 | Lee et al. | |
| 8,698,492 B1 | 4/2014 | Mak et al. | |
| 8,699,171 B1 | 4/2014 | Boyle | |
| 8,699,172 B1 | 4/2014 | Gunderson et al. | |
| 8,711,500 B1 | 4/2014 | Fong et al. | |
| 8,711,506 B1 | 4/2014 | Giovenzana et al. | |
| 8,711,665 B1 | 4/2014 | Abdul Hamid | |
| 8,717,694 B1 | 5/2014 | Liew et al. | |
| 8,717,695 B1 | 5/2014 | Lin et al. | |
| 8,717,697 B1 * | 5/2014 | Kondo et al. | 360/39 |
| 8,730,612 B1 | 5/2014 | Haralson | |
| 8,743,502 B1 | 6/2014 | Bonke et al. | |
| 8,749,911 B1 | 6/2014 | Sun et al. | |
| 8,753,146 B1 | 6/2014 | Szeremeta et al. | |
| 8,755,136 B1 | 6/2014 | Ng et al. | |
| 8,756,361 B1 | 6/2014 | Carlson et al. | |
| 8,760,782 B1 | 6/2014 | Garani et al. | |
| 8,760,792 B1 | 6/2014 | Tam | |
| 8,769,593 B1 | 7/2014 | Schwartz et al. | |
| 8,773,793 B1 | 7/2014 | McFadyen | |
| 8,773,802 B1 | 7/2014 | Anderson et al. | |
| 8,773,807 B1 | 7/2014 | Chia et al. | |
| 8,773,957 B1 | 7/2014 | Champion et al. | |
| 8,780,470 B1 | 7/2014 | Wang et al. | |
| 8,782,334 B1 | 7/2014 | Boyle et al. | |
| 8,786,976 B1 | 7/2014 | Kang et al. | |
| 8,787,125 B1 | 7/2014 | Lee | |
| 8,792,196 B1 | 7/2014 | Lee | |
| 8,792,200 B1 | 7/2014 | Tam et al. | |
| 8,797,667 B1 | 8/2014 | Barlow et al. | |
| 8,799,977 B1 | 8/2014 | Kapner, III et al. | |
| 8,817,413 B1 | 8/2014 | Knigge et al. | |
| 8,817,584 B1 | 8/2014 | Selvaraj | |
| 8,825,976 B1 | 9/2014 | Jones | |

(56) References Cited

U.S. PATENT DOCUMENTS

| | | |
|---|---|---|
| 8,825,977 B1 | 9/2014 | Syu et al. |
| 2002/0154430 A1 | 10/2002 | Rae et al. |
| 2004/0037202 A1 | 2/2004 | Brommer et al. |
| 2004/0196897 A1 | 10/2004 | Tan et al. |
| 2005/0226316 A1 | 10/2005 | Higashino et al. |
| 2007/0076826 A1 | 4/2007 | Stockmanns et al. |
| 2007/0085709 A1 | 4/2007 | Coene et al. |
| 2007/0201585 A1 | 8/2007 | Feng |
| 2008/0192378 A1 | 8/2008 | Bliss et al. |
| 2009/0113702 A1 | 5/2009 | Hogg |
| 2010/0067621 A1 | 3/2010 | Noeldner et al. |
| 2010/0085849 A1 | 4/2010 | Yin et al. |
| 2010/0306551 A1 | 12/2010 | Meyer et al. |
| 2011/0226729 A1 | 9/2011 | Hogg |
| 2011/0242692 A1 | 10/2011 | Blinick et al. |
| 2011/0246864 A1 | 10/2011 | Eleftheriou et al. |
| 2012/0089657 A1 | 4/2012 | Yang et al. |
| 2012/0120784 A1 | 5/2012 | Yang et al. |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0182347 A1 | 7/2013 | Maeto; Nobuhiro |
| 2013/0215528 A1 | 8/2013 | Okubo et al. |
| 2013/0223199 A1 | 8/2013 | Lund et al. |

* cited by examiner

US 8,947,812 B1

DATA STORAGE DEVICE COMPRISING EQUALIZER FILTER AND INTER-TRACK INTERFERENCE FILTER

BACKGROUND

Data storage systems such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

When reading data from the disk, a read channel typically samples the read signal to generate read signal samples that are equalized according to a target response (e.g., a partial response). A data detector (e.g., a Viterbi detector) detects an estimated data sequence from the equalized samples, and errors in the estimated data sequence are corrected, for example, using a Reed-Solomon error correction code (ECC) or using a low density parity check (LDPC) algorithm.

DETAILED DESCRIPTION

Figure 2:
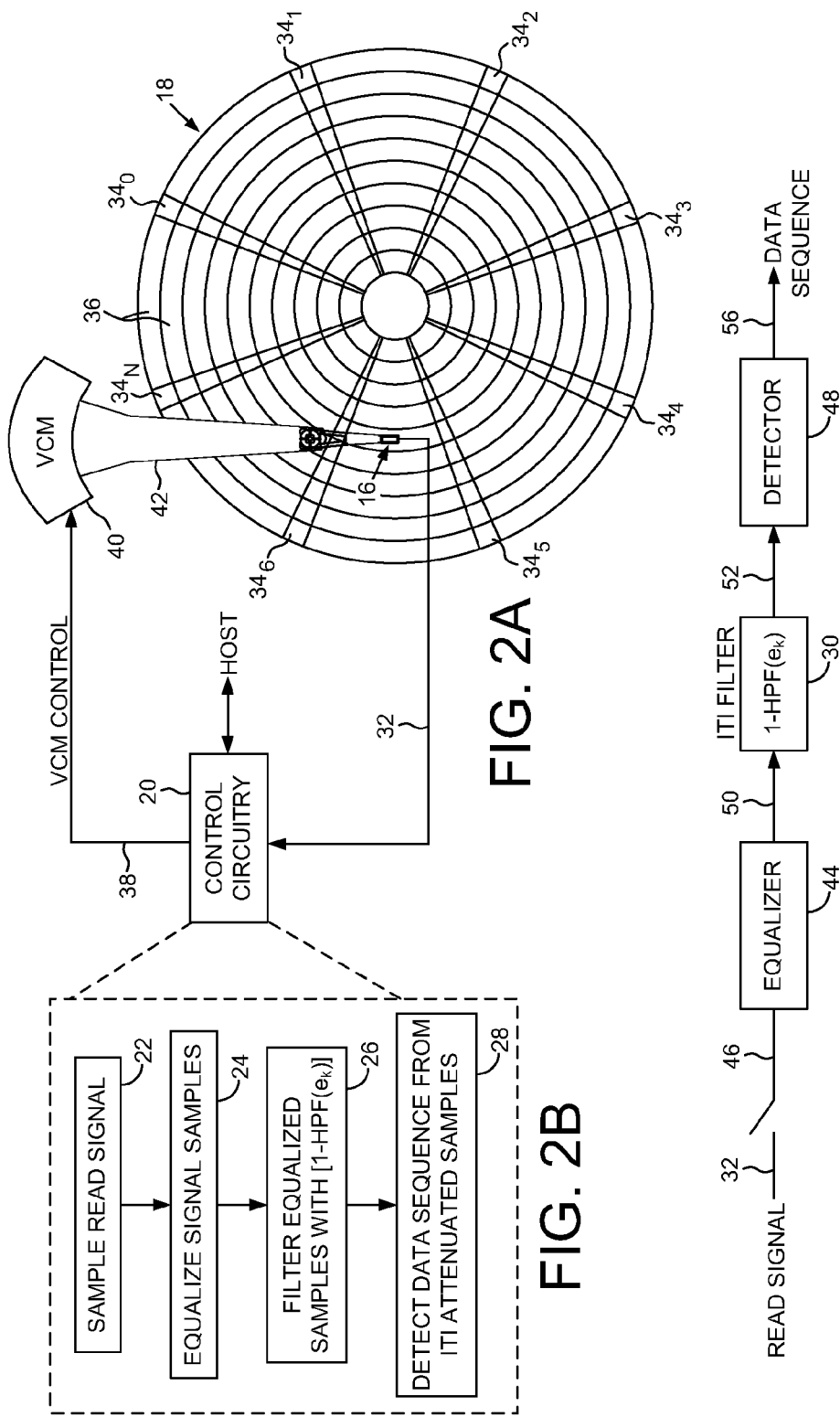
FIG. 2A shows a data storage device in the form of a disk drive according to an embodiment comprising a head actuated over a disk.
FIG. 2B is a flow diagram according to an embodiment wherein equalized samples are filtered with an inter-track interference (ITI) filter to generate ITI attenuated samples, and a data sequence is detected based on the ITI attenuated samples.
FIG. 2C shows control circuitry according to an embodiment wherein the ITI filter comprises a transfer function $1-\text{HPF}(e_k)$.

FIG. 2A shows a data storage device in the form of a disk drive according to an embodiment comprising a head 16 actuated over a disk 18. The disk drive further comprises control circuitry 20 configured to execute the flow diagram of FIG. 2B which is understood with reference to FIG. 2C, wherein a read signal from the head is sampled to generate signal samples (block 22), and the signal samples are filtered with an equalizer filter to generate equalized samples (block 24). The equalized samples are filtered with an inter-track interference (ITI) filter to generate ITI attenuated samples (block 26), and a data sequence is detected based on the ITI attenuated samples (block 28). In the embodiment of FIG. 2C, the ITI filter 30 comprises a transfer function:

$$1-\text{HPF}(e_k)$$

where $e_k$ represents a noise sequence in the equalized samples, and HPF represents a high pass filter operating on $e_k$.

Figure 1:
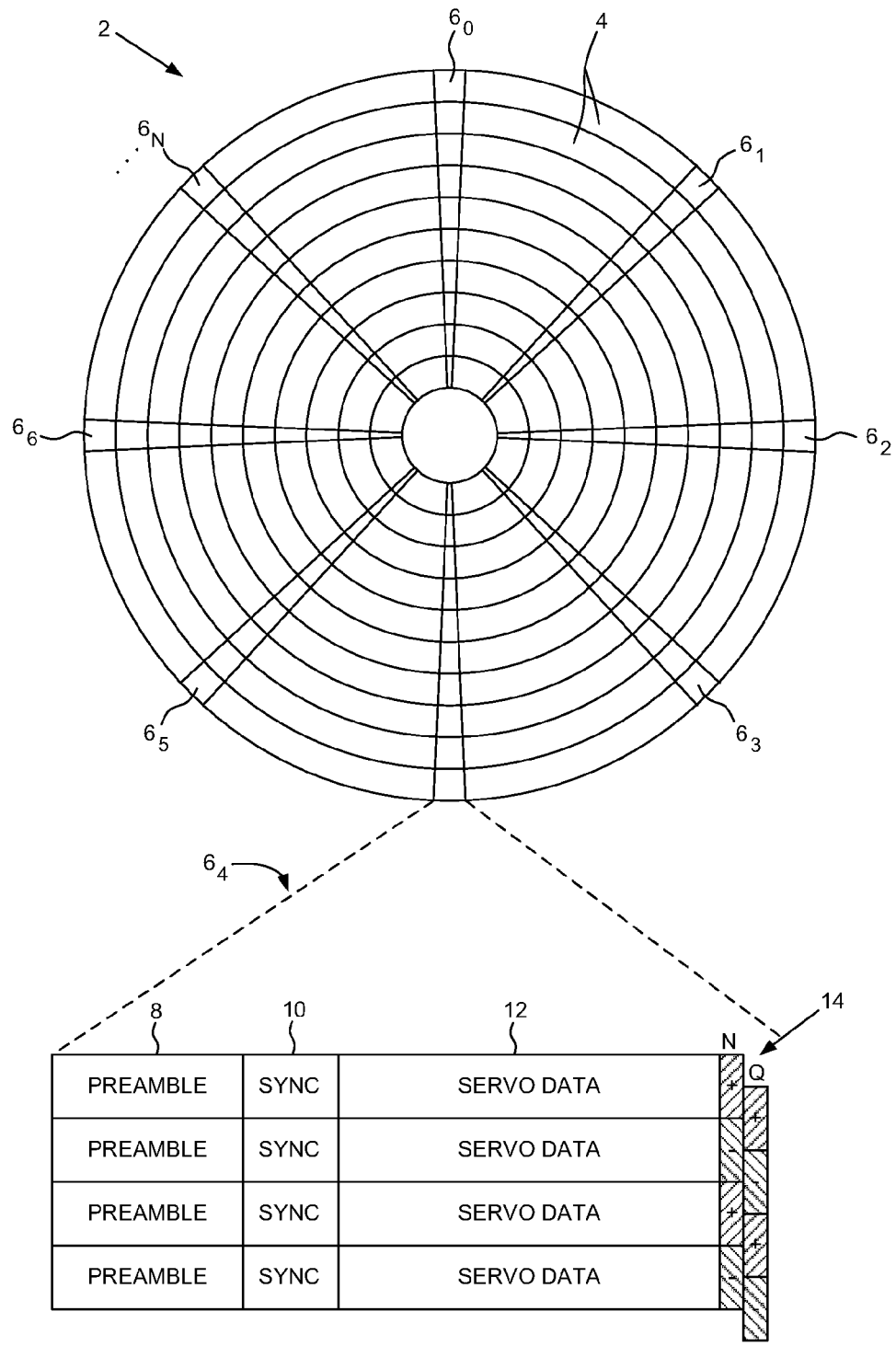
FIG. 1 shows a prior art disk format comprising a plurality of servo tracks defined by servo sectors.

In the embodiment of FIG. 2A, the control circuitry 20 processes the read signal 32 emanating from the head 16 to demodulate servo sectors $34_0$-$34_N$ that define tracks 36. A position error signal (PES) is generated representing an error between the actual position of the head and a target position relative to a target track. A servo control system in the control circuitry 20 filters the PES using a suitable compensation filter to generate a control signal 38 applied to a voice coil motor (VCM) 40 which rotates an actuator arm 42 about a pivot in order to actuate the head 16 radially over the disk 18 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In the embodiment of FIG. 2C, the equalizer filter 44 may equalize the signal samples 46 based on any suitable criteria, such as equalizing the signal samples based on a suitable partial response (PR) signaling scheme. In addition, the data detector 48 may implement any suitable data detection algorithm, such as a maximum likelihood (ML) sequence detection algorithm (e.g., a Viterbi algorithm), or a suitable iterative algorithm (e.g., a low density parity check (LDPC) algorithm), a combination of the algorithms, or any other suitable algorithm. As the tracks 36 in FIG. 2A are squeezed closer together in an effort to increase the recording density, the read signal 32 generated while the head is tracking a target track will be distorted due to inter-track interference (ITI) from the adjacent tracks. This ITI from adjacent tracks reduces the efficacy of the data detector 48 to accurately detect the data sequence recorded in the target track.

Accordingly, in one embodiment an ITI filter is employed between the equalizer 44 and the data detector 48 which attenuates the ITI in the equalized samples 50 thereby generating ITI attenuated samples 52 processed by the data detector 48. In one embodiment, the ITI in the equalized samples 50 manifests in the higher frequency noise of the read signal. Accordingly, in the embodiment of FIG. 2C the ITI filter 30 comprises a transfer function which subtracts the high frequency noise from the equalized samples 50. In one embodiment, a noise sequence $e_k$ in the equalized samples 50 is generated by computing a difference between the equalized samples 50 and corresponding ideal samples. This noise sequence $e_k$ is then filtered by a high pass filter to extract the high frequency noise component which is subtracted from the equalized samples 50 as illustrated in FIG. 2C.

Figure 3:
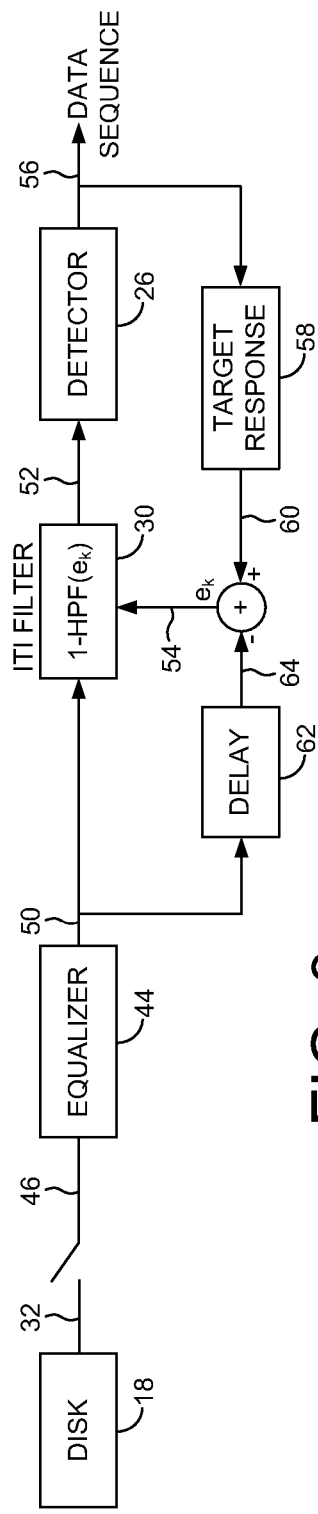
FIG. 3 shows control circuitry according to an embodiment wherein the noise sequence $e_k$ is generated by computing a difference between the equalized samples and corresponding ideal samples generated based on the detected data sequence.

The noise sequence $e_k$ representing the noise in the equalized samples 50 may be generated in any suitable manner. FIG. 3 shows an embodiment wherein the noise sequence 54 is generated based on the detected data sequence 56. The detected data sequence 56 is filtered by a target response 58 representing the target response of the recording channel to generate ideal samples 60. The equalized samples 50 are passed through a delay 62 that accounts for the delay of the data detector 48, and the delayed samples 64 are subtracted from the ideal samples 60 to generate the noise sequence $e_k$ 54 processed by the ITI filter 30.

Figure 4:
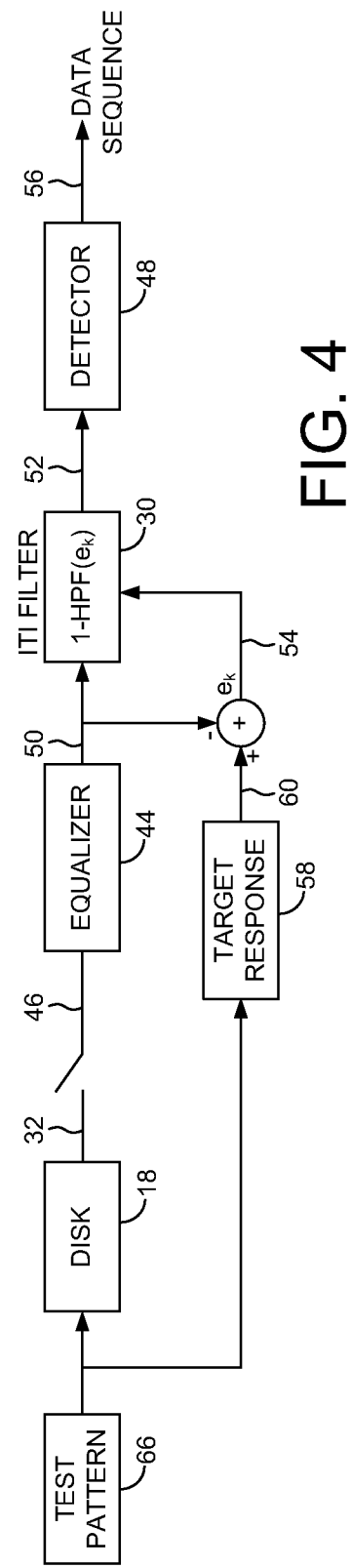
FIG. 4 shows control circuitry according to an embodiment wherein the noise sequence $e_k$ is generated by computing a difference between the equalized samples and corresponding ideal samples generated based on a test pattern written to the disk.

FIG. 4 shows an alternative embodiment for generating the noise sequence $e_k$ representing the noise in the equalized samples 50. In this embodiment, a known test pattern 66 is written to the disk 18. When reading the known test pattern 66 from the disk 18, the test pattern 66 is filtered by the target response 58 to generate the ideal samples 60, and the equalized samples 50 are subtracted from the ideal samples 60 to generate the noise sequence $e_k$ 54 processed by the ITI filter 30. The embodiment of FIG. 4 may be employed, for example, during a calibration procedure that calibrates parameters of the read channel, such as the equalizer 44 and/or the data detector 48. When reading user data during normal in-the-field read operations, the noise sequence $e_k$ 54 may be generated based on the detected data sequence 56 as shown in FIG. 3.

Figure 5:
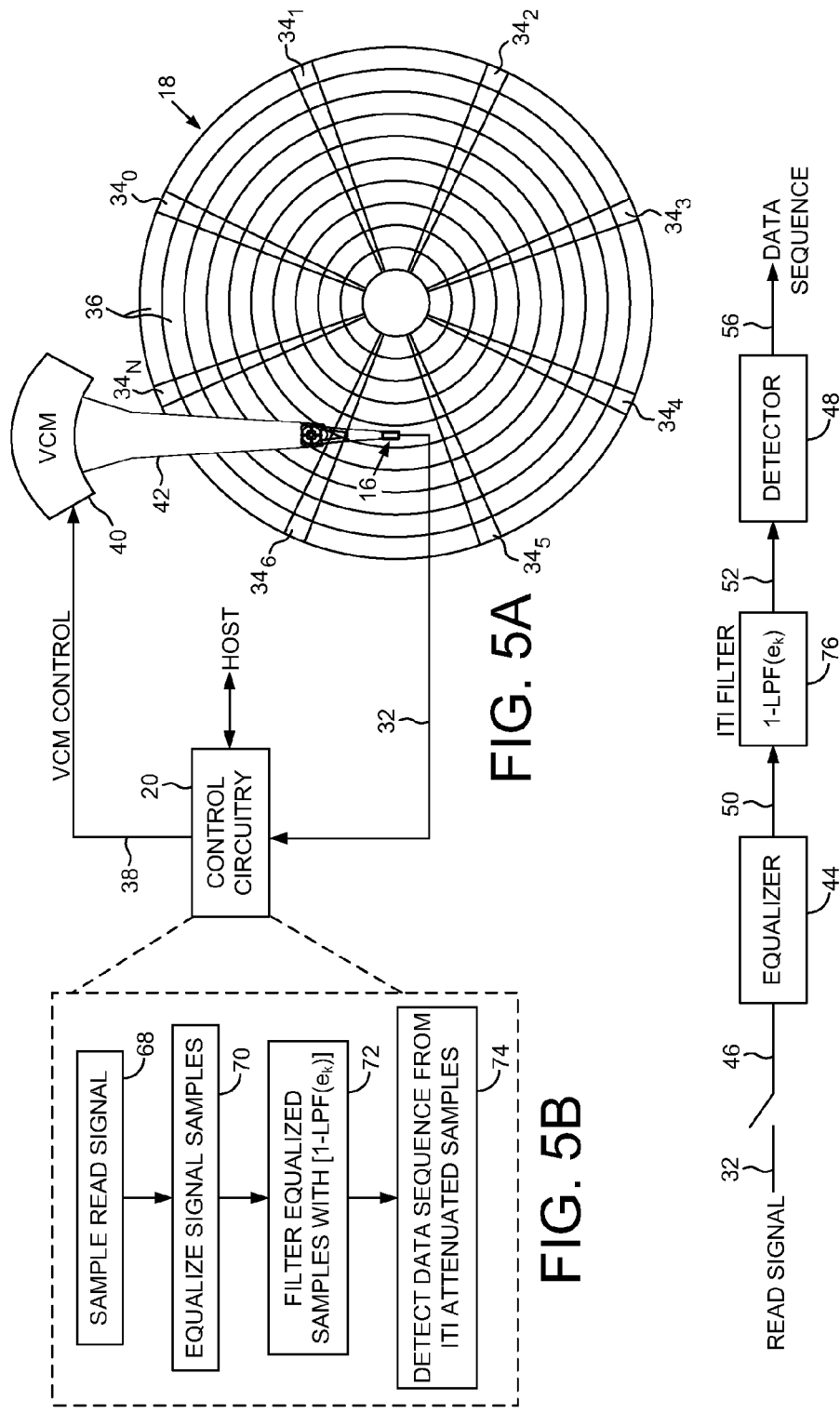
FIG. 5A shows a data storage device in the form of a disk drive according to an embodiment comprising a head actuated over a disk.
FIG. 5B is a flow diagram according to an embodiment wherein equalized samples are filtered with an inter-track interference (ITI) filter to generate ITI attenuated samples, and a data sequence is detected based on the ITI attenuated samples.
FIG. 5C shows control circuitry according to an embodiment wherein the ITI filter comprises a transfer function $1-\text{LPF}(e_k)$.

FIG. 5A shows a data storage device in the form of a disk drive according to an embodiment comprising a head 16 actuated over a disk 18. The disk drive further comprises control circuitry 20 configured to execute the flow diagram of FIG. 5B which is understood with reference to FIG. 5C, wherein a read signal from the head is sampled to generate signal samples (block 68), and the signal samples are filtered with an equalizer filter to generate equalized samples (block 70). The equalized samples are filtered with an inter-track interference (ITI) filter to generate ITI attenuated samples (block 72), and a data sequence is detected based on the ITI attenuated samples (block 74). In the embodiment of FIG. 5C, the ITI filter 76 comprises a transfer function:

$$1-\text{LPF}(e_k)$$

where $e_k$ represents a noise sequence in the equalized samples, and LPF represents a low pass filter operating on $e_k$.

In the embodiment of FIG. 5C, the ITI in the equalized samples 50 manifests in the lower frequency noise of the read signal. Accordingly, in the embodiment of FIG. 5C the ITI filter 76 comprises a transfer function which subtracts the low frequency noise from the equalized samples 50. In one embodiment, a noise sequence $e_k$ in the equalized samples 50 is generated by computing a difference between the equalized samples 50 and corresponding ideal samples. This noise sequence $e_k$ is then filtered by a low pass filter to extract the low frequency noise component which is subtracted from the equalized samples 50 as illustrated in FIG. 5C.

Figure 6:
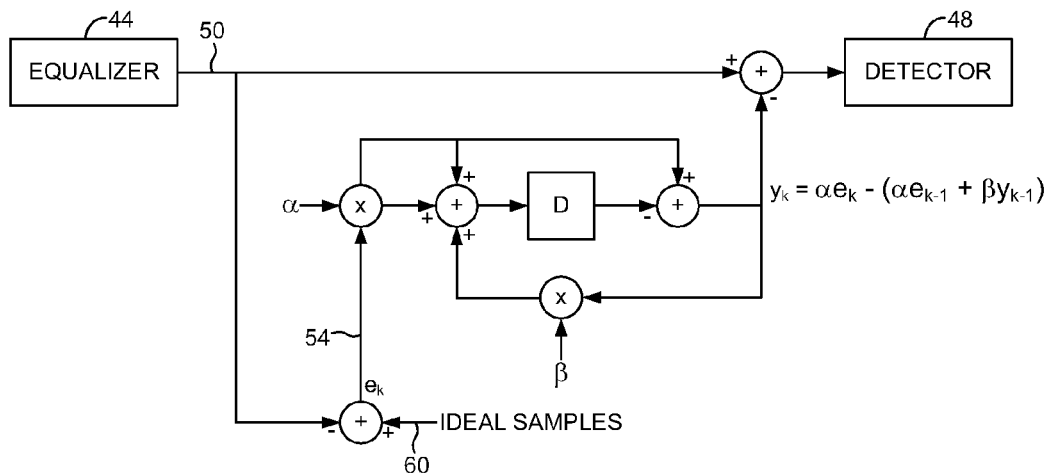
FIG. 6 shows an ITI filter according to an embodiment wherein the HPF comprises a form $y_k = \alpha e_k - (\alpha e_{k-1} + \beta y_{k-1})$.

The high pass filter (HPF) in the ITI filter 30 of FIG. 2C may be implemented in any suitable manner. FIG. 6 shows an embodiment wherein the high pass filter comprises a form:

$$y_k = \alpha e_k - (\alpha e_{k-1} + \beta y_{k-1})$$

where $y_k$ represents an output of the HPF, and $\alpha$ and $\beta$ are coefficients. In one embodiment, the coefficients $\alpha$ and $\beta$ are programmable and may be adapted during a calibration operation and/or in real-time while detecting user data during normal read operations. For example, the coefficients $\alpha$ and $\beta$ may be adapted based on any suitable quality metric, such as bit error rate, log likelihood ratios of the data detector, number of detector iterations, or any other read channel parameter indicative of the quality of the ITI filter 30.

Figure 7:
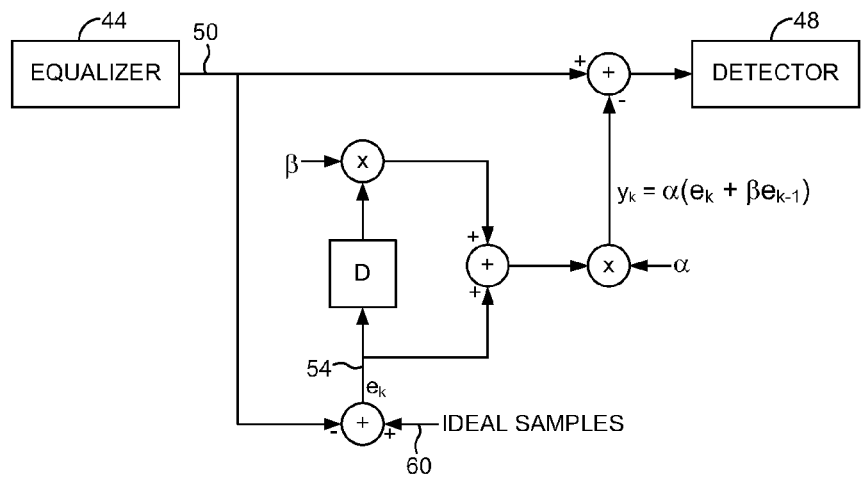
FIG. 7 shows an ITI filter according to an embodiment wherein the LPF comprises a form $y_k = \alpha(e_k + \beta e_{k-1})$.

The low pass filter (LPF) in the ITI filter 76 of FIG. 5C may be implemented in any suitable manner. FIG. 7 shows an embodiment wherein the low pass filter comprises a form:

$$y_k = \alpha(e_k + \beta e_{k-1})$$

where $y_k$ represents an output of the LPF, and $\alpha$ and $\beta$ are coefficients. In one embodiment, the coefficients $\alpha$ and $\beta$ are programmable and may be adapted during a calibration operation and/or in real-time while detecting user data during normal read operations. For example, the coefficients $\alpha$ and $\beta$ may be adapted based on any suitable quality metric, such as bit error rate, log likelihood ratios of the data detector, number of detector iterations, or any other read channel parameter indicative of the quality of the ITI filter 76.

Figure 8:
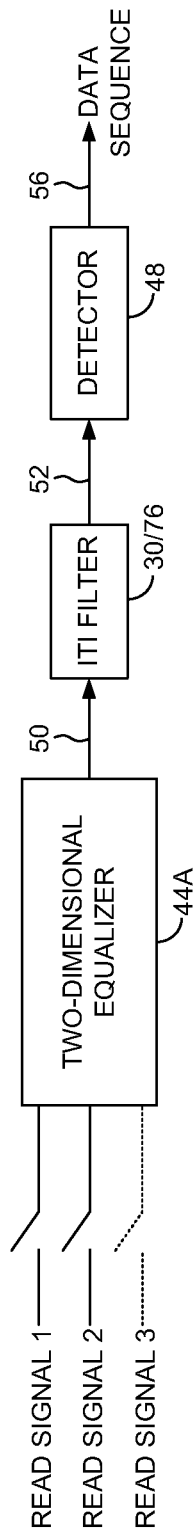
FIG. 8 shows control circuitry according to an embodiment wherein the head comprises multiple read elements for generating multiple read signals that are equalized using a two-dimensional equalizer to generate the equalized samples.

Any suitable equalizer 44 may be employed in the embodiment of FIG. 2C or 5C. FIG. 8 shows control circuitry according to an embodiment wherein the head 16 comprises multiple read elements for generating multiple read signals that are equalized using a two-dimensional equalizer 44A to generate the equalized samples 50. In one embodiment, during a read operation a first one of the read elements is positioned over a target data track and a second one of the read elements is positioned at least partially over a first adjacent data track. In an optional embodiment, a third read element may be positioned at least partially over a second adjacent data track. The two-dimensional equalizer 44A processes the multiple read signals to attenuate ITI in the equalized samples 50 representing the read signal for the target data track. However, certain constraints of the two-dimensional equalizer 44A (e.g., a limited number of taps) may leave a residual ITI in the equalized samples 50. Accordingly, in one embodiment the residual ITI in the equalized samples 50 may be further attenuated using the ITI filter 30 of FIG. 2C and/or the ITI filter 76 of FIG. 5C.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

What is claimed is:

1. A data storage device comprising:
a disk;
a head actuated over the disk; and
control circuitry configured to:
sample a read signal from the head to generate signal samples;
filter the signal samples with an equalizer filter to generate equalized samples;
filter the equalized samples with an inter-track interference (ITI) filter to generate ITI attenuated samples; and
detect a data sequence based on the ITI attenuated samples,
wherein the ITI filter comprises a transfer function:

$$1-\text{HPF}(e_k)$$

where:
$e_k$ represents a noise sequence in the equalized samples; and
HPF represents a high pass filter operating on $e_k$.

2. The data storage device as recited in claim 1, wherein the HPF comprises a form:

$$y_k = \alpha e_k - (\alpha e_{k-1} + \beta y_{k-1})$$

where:
$y_k$ represents an output of the HPF; and
$\alpha$ and $\beta$ are coefficients.

3. The data storage device as recited in claim 2, where $\alpha$ and $\beta$ are programmable coefficients.

4. The data storage device as recited in claim 1, where the control circuitry is further configured to generate the noise sequence by computing a difference between the equalized samples and corresponding ideal samples.

5. The data storage device as recited in claim 4, where the control circuitry is further configured to generate the ideal samples based on the detected data sequence.

6. The data storage device as recited in claim 4, where the control circuitry is further configured to generate the ideal samples based on a test pattern written to the disk.

7. A data storage device comprising:
a disk;
a head actuated over the disk; and
control circuitry configured to:
sample a read signal from the head to generate signal samples;
filter the signal samples with an equalizer filter to generate equalized samples;
filter the equalized samples with an inter-track interference (ITI) filter to generate ITI attenuated samples; and
detect a data sequence based on the ITI attenuated samples,
wherein the ITI filter comprises a transfer function:

$$1-\text{LPF}(e_k)$$

where:
$e_k$ represents a noise sequence in the equalized samples; and
LPF represents a low pass filter operating on $e_k$.

8. The data storage device as recited in claim 7, wherein the LPF comprises a form:

$$y_k = \alpha(e_k + \beta e_{k-1})$$

where:
$y_k$ represents an output of the LPF; and
$\alpha$ and $\beta$ are coefficients.

9. The data storage device as recited in claim 8, where $\alpha$ and $\beta$ are programmable coefficients.

10. The data storage device as recited in claim 7, where the control circuitry is further configured to generate the noise sequence by computing a difference between the equalized samples and corresponding ideal samples.

11. The data storage device as recited in claim 10, where the control circuitry is further configured to generate the ideal samples based on the detected data sequence.

12. The data storage device as recited in claim 10, where the control circuitry is further configured to generate the ideal samples based on a test pattern written to the disk.

13. A method of operating a data storage device, the method comprising:
sampling a read signal from a head actuated over a disk to generate signal samples;
filtering the signal samples with an equalizer filter to generate equalized samples;
filtering the equalized samples with an inter-track interference (ITI) filter to generate ITI attenuated samples; and
detecting a data sequence based on the ITI attenuated samples,
wherein the ITI filter comprises a transfer function:

$$1-\text{HPF}(e_k)$$

where:
$e_k$ represents a noise sequence in the equalized samples; and
HPF represents a high pass filter operating on $e_k$.

14. The method device as recited in claim 13, wherein the HPF comprises a form:

$$y_k = \alpha e_k - (\alpha e_{k-1} + \beta y_{k-1})$$

where:
$y_k$ represents an output of the HPF; and
$\alpha$ and $\beta$ are coefficients.

15. The method as recited in claim 14, where $\alpha$ and $\beta$ are programmable coefficients.

16. The method as recited in claim 13, further comprising generating the noise sequence by computing a difference between the equalized samples and corresponding ideal samples.

17. The method as recited in claim 16, further comprising generating the ideal samples based on the detected data sequence.

18. The method as recited in claim 16, further comprising generating the ideal samples based on a test pattern written to the disk.

19. A method of operating a data storage device, the method comprising:
sampling a read signal from a head actuated over a disk to generate signal samples;
filtering the signal samples with an equalizer filter to generate equalized samples;
filtering the equalized samples with an inter-track interference (ITI) filter to generate ITI attenuated samples; and
detecting a data sequence based on the ITI attenuated samples,
wherein the ITI filter comprises a transfer function:

$$1 - \text{LPF}(e_k)$$

where:
$e_k$ represents a noise sequence in the equalized samples; and
LPF represents a low pass filter operating on $e_k$.

20. The method as recited in claim 19, wherein the LPF comprises a form:

$$y_k = \alpha(e_k + \beta e_{k-1})$$

where:
$y_k$ represents an output of the LPF; and
$\alpha$ and $\beta$ are coefficients.

21. The method as recited in claim 20, where $\alpha$ and $\beta$ are programmable coefficients.

22. The method as recited in claim 19, further comprising generating the noise sequence by computing a difference between the equalized samples and corresponding ideal samples.

23. The method as recited in claim 22, further comprising generating the ideal samples based on the detected data sequence.

24. The method as recited in claim 22, further comprising generating the ideal samples based on a test pattern written to the disk.

* * * * *